Figure 3:
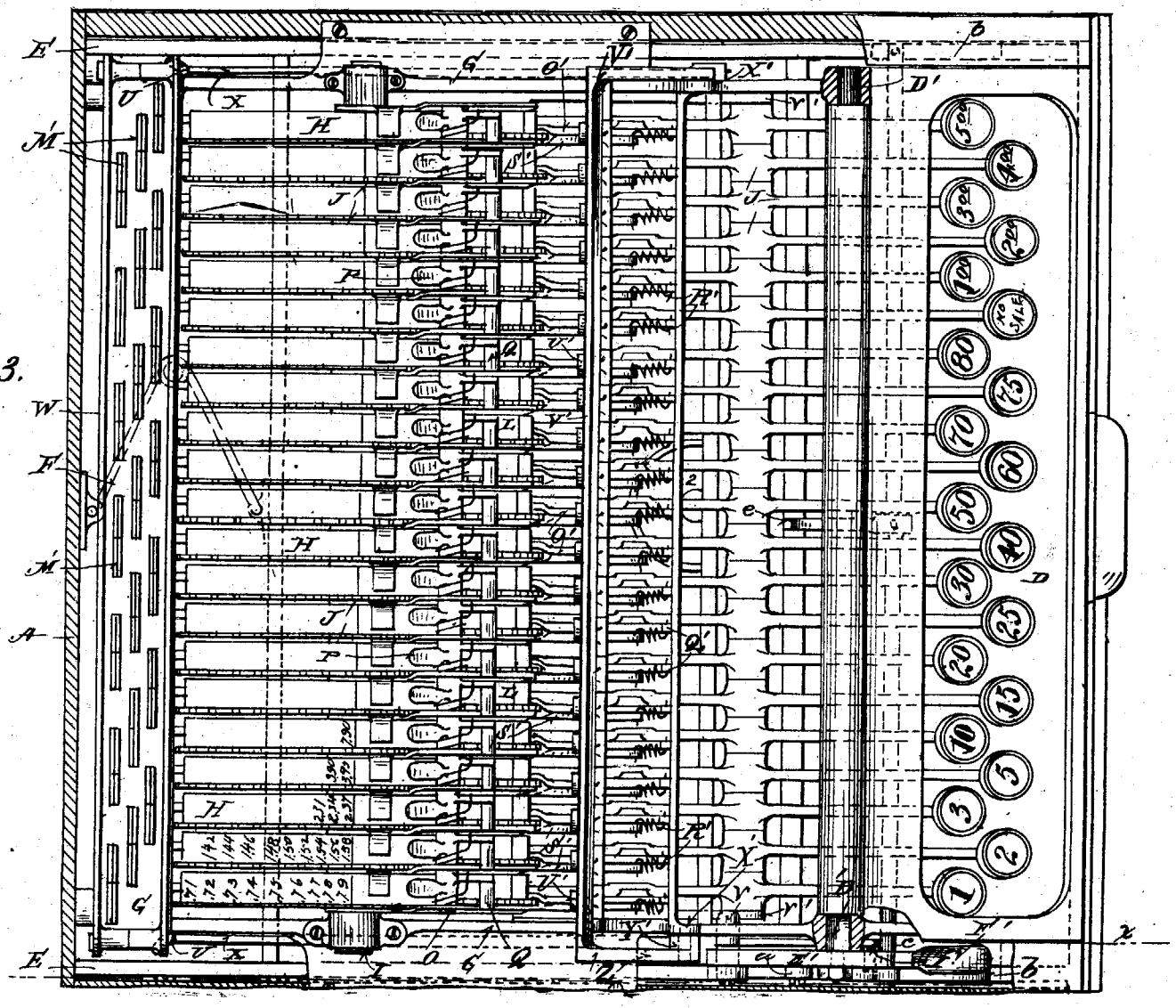

No. 12,000. Reissued June 10, 1902.
R. P. THOMPSON.
CASH REGISTER.
(Application filed May 25, 1896.)
8 Sheets—Sheet 1.
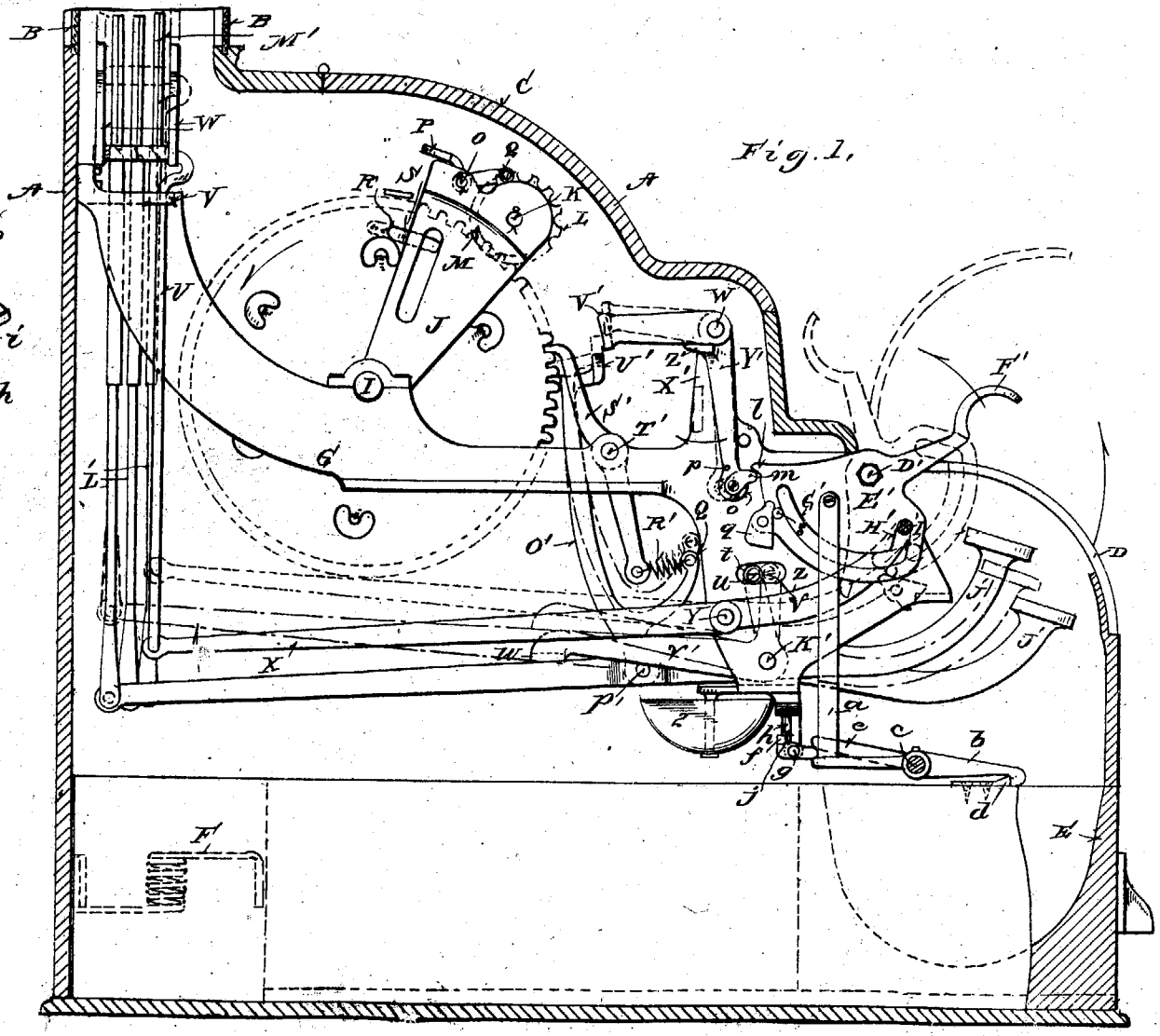
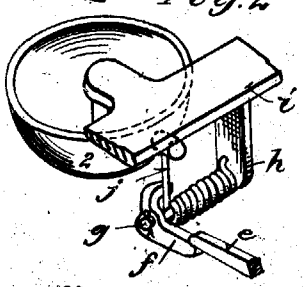
Witnesses
Jas. C. Fawley
W. M. McNair.
Inventor
Ralph P. Thompson,
By his Attorney
H. S. Parkinson.

No. 12,000. Reissued June 10, 1902.

R. P. THOMPSON.

CASH REGISTER.

(Application filed May 25, 1896.)

8 Sheets—Sheet 2.

Witnesses
Jas. B. Fowler
N. M. McNair.

Inventor
Rufus P. Thompson,
By his Attorney
H. A. Toulmin.

No. 12,000.

Reissued June 10, 1902.

R. P. THOMPSON.

CASH REGISTER.

(Application filed May 25, 1896.)

8 Sheets—Sheet 3.

Witnesses

Jas. C. Dawley

W. M. McNair.

Inventor

Ralph P. Thompson.

By his Attorney

H. A. Toulmin.

No. 12,000.
Reissued June 10, 1902.
R. P. THOMPSON.
CASH REGISTER.
(Application filed May 25, 1896.)
8 Sheets—Sheet 4.
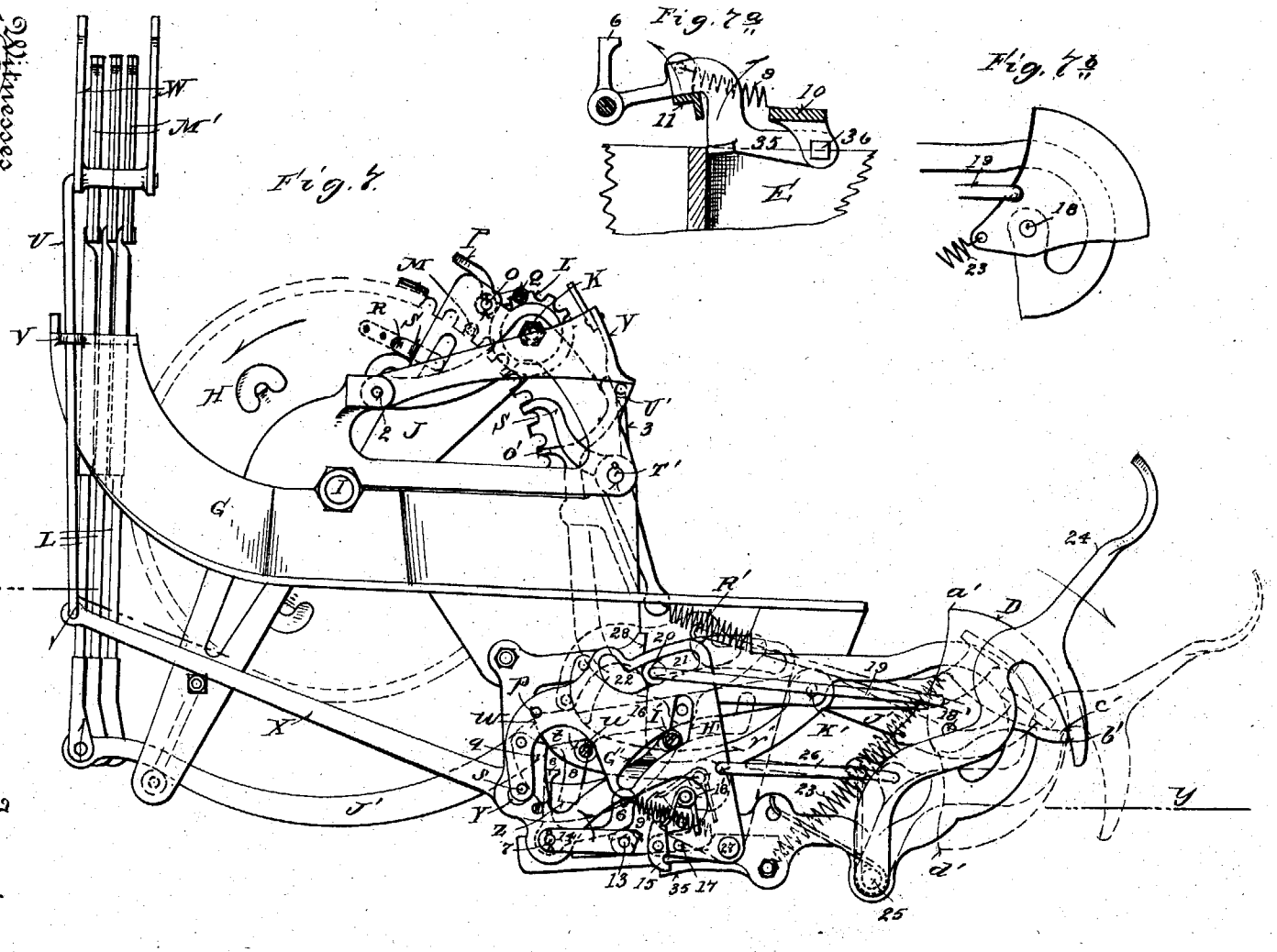
Witnesses
Jas. P. Lawley
W. M. McNair.
Inventor
Ralph P. Thompson,
By his Attorney
H. A. Toulmin.

No. 12,000. Reissued June 10, 1902.
R. P. THOMPSON.
CASH REGISTER.
(Application filed May 25, 1896.)
8 Sheets—Sheet 5.
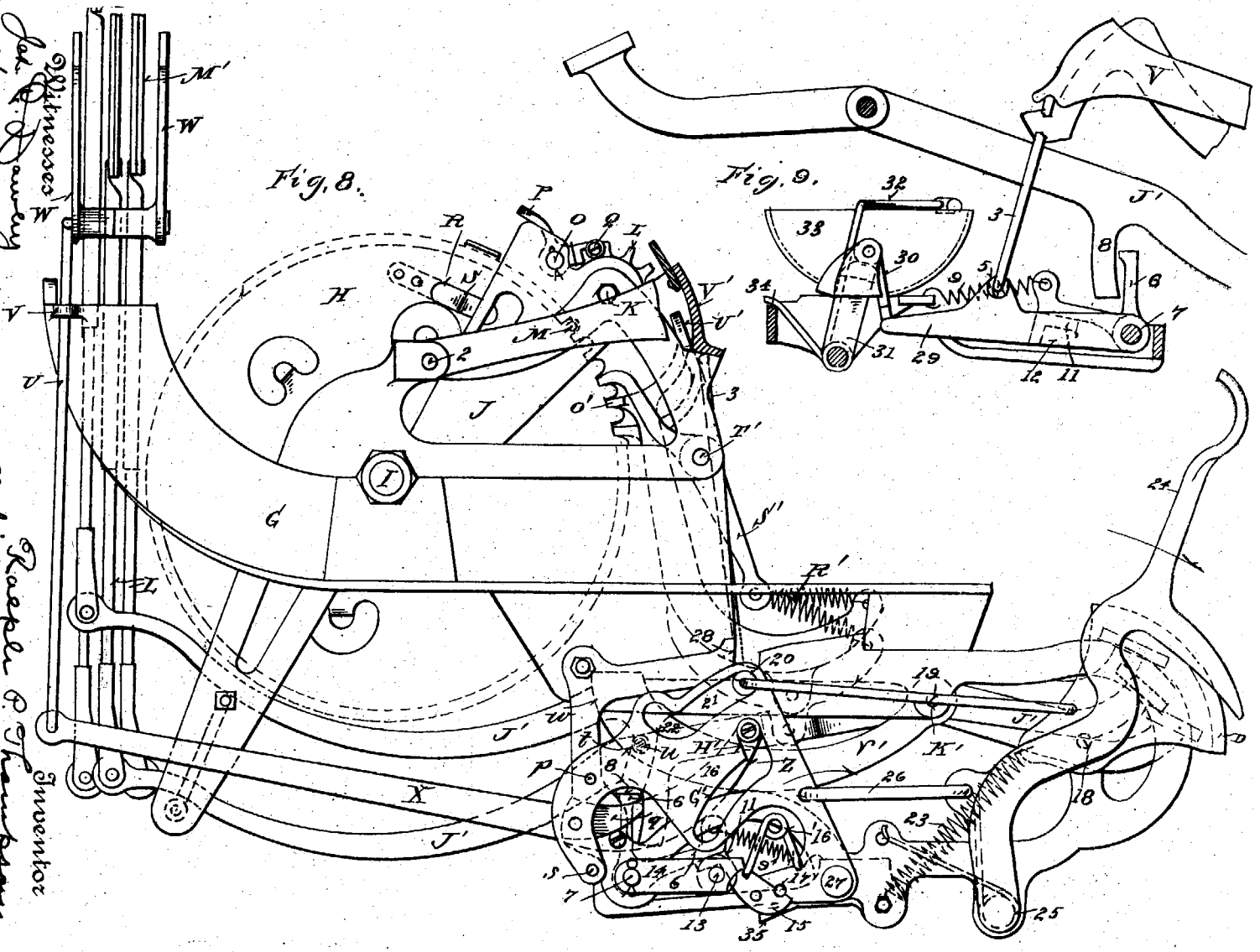
Witnesses:
Jas. E. Lawery
H. M. McNair.
Inventor
Raeph P. Thompson,
By his Attorney
H. A. Toulmin No. 12,000.
Reissued June 10, 1902.
R. P. THOMPSON.
CASH REGISTER.
(Application filed May 25, 1896.)
8 Sheets—Sheet 6.
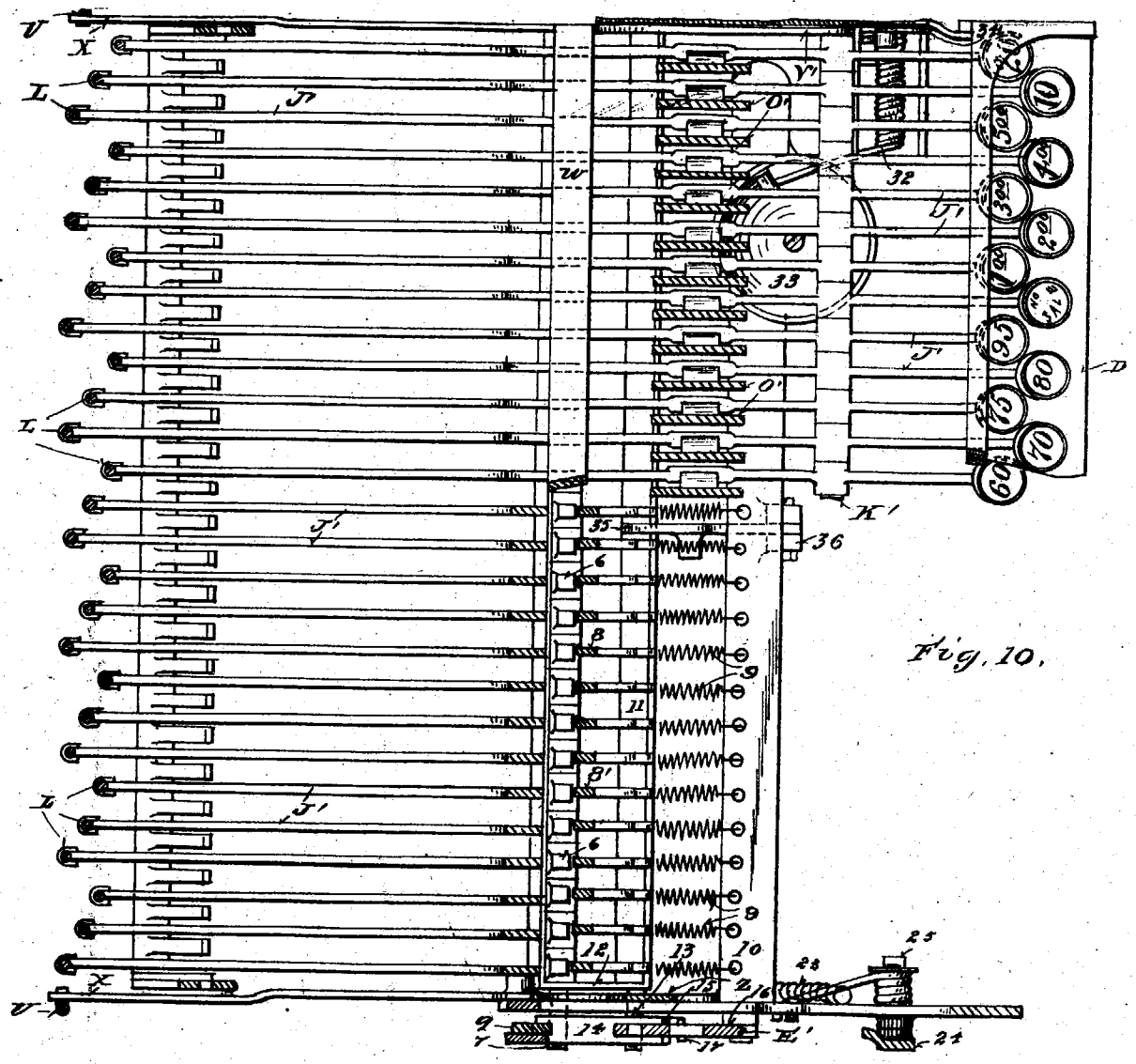
Witnesses
Jas. C. Dawley
W. M. McNair.
Inventor
Ralph P. Thompson,
By his Attorney
H. S. Taulmin.

No. 12,000.

Reissued June 10, 1902.

R. P. THOMPSON.

CASH REGISTER.

(Application filed May 25, 1896.)

8 Sheets—Sheet 7.

Witnesses
Jas. C. Dawley.
W. M. McNair

Inventor
Rufus P. Thompson
By his Attorney
H. A. Toulmin.

No. 12,000.
Reissued June 10, 1902.
R. P. THOMPSON.
CASH REGISTER.
(Application filed May 25, 1896.)
8 Sheets—Sheet 8.
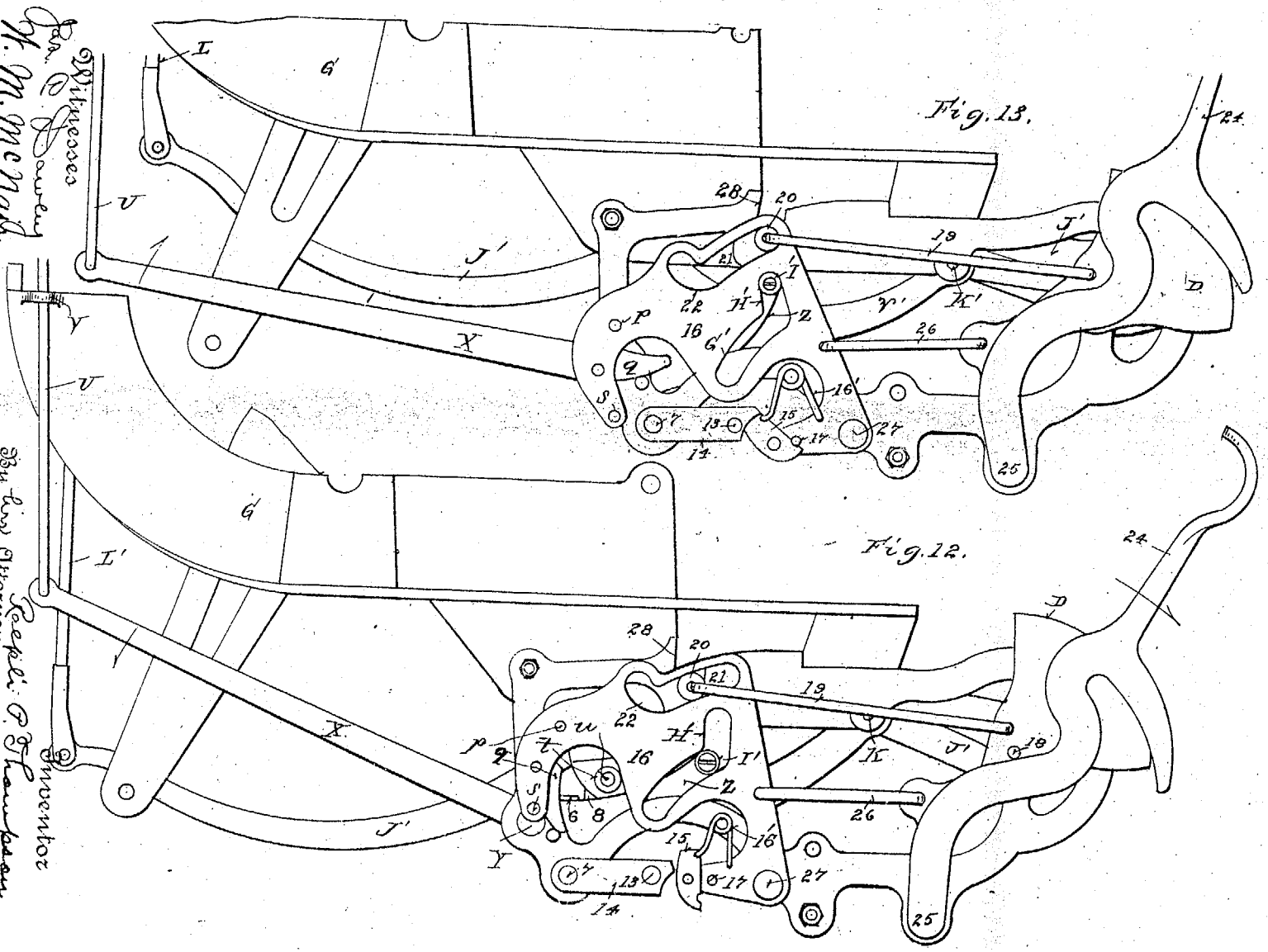
Witnesses
Jas. C. Dawley
W. M. McNair
Inventor
Raeph P. Thompson,
By his Attorney
H. S. Toulmin.

BEST AVAILABLE COPY

UNITED STATES PATENT OFFICE.

RALPH P. THOMPSON, OF SPRINGFIELD, OHIO, ASSIGNOR TO THE NATIONAL CASH REGISTER CO., OF DAYTON, OHIO, A CORPORATION OF OHIO.

CASH-REGISTER.

SPECIFICATION forming part of Reissued Letters Patent No. 12,060, dated June 10, 1902.

Original No. 532,924, dated January 22, 1895. Application for reissue filed May 25, 1896. Serial No. 592,395.

*To all whom it may concern:*

Be it known that I, RALPH P. THOMPSON, a citizen of the United States, residing at Springfield, in the county of Clark and State of Ohio, have invented certain new and useful Improvements in Cash-Registers, of which the following is a specification, reference being had therein to the accompanying drawings.

This invention relates to certain new and useful improvements in cash-registers of the class wherein registering mechanism is operated and the amount of the purchase exhibited to the view of the purchaser by actuating certain keys or levers.

I believe myself to be the first inventor to produce a cash-register embodying the following objects and mechanism to carry them into practical effect:

First. To prevent any key or keys from being operated while any other key is in indicating position—that is, in the position which it occupies while the amount corresponding with it is in a state of exhibition—which I regard as necessary to the most perfect organization of machine, and to effect the positive return of any key from indicating position to normal position as a preparatory step to resetting the machine to condition to allow of the next sale being registered, and to control these two operations by a lever or operating device accessible to the hand.

First *a*. A key-cover to exclude access to a depressed key to prevent such key from being partially manipulated when a succeeding sale is made, which partial manipulation might result in again exhibiting the same purchase-card, yet without causing the registering mechanism to operate, and thus resulting in exhibiting such subsequent sale without registering it. This is to protect the proprietor against dishonest employees.

Second. An arrangement of pawls, keys, registering mechanism, and a stop-bar by which the pawls are made to act to suspend and hold the keys in operated position.

Third. A cancel-card which becomes displayed at or about the time said cover starts to open and remains so displayed until the cover again closes, during which interval of display the indicator last exhibited is withdrawn and the indicator for the amount next sold becomes exhibited, so that if a dishonest employee should do anything to keep the key-cover partially open for any fraudulent purpose he might conceive the cancel-card would still remain displayed and the indicator showing the amount just registered be hidden from the view of the purchaser, thus at once showing that the employee had been guilty of some fraudulent act.

Fourth. A presser-bar and its intermediate mechanism to depress any elevated key with its indicator when the machine is manipulated for a subsequent sale, so that the last previous indicator shall be automatically depressed by the very act of operating the machine into position for access to another key for a subsequent sale, whereby as one of the results of this provision a dishonest employee would be prevented from the possibility of maintaining a key down and an indicator up while registering another amount, which, if permitted, would enable him to exhibit in such second registry a smaller sum than the amount then received, but which with the amount already standing exhibited would be equal to the amount then received, so that if a dollar was standing exhibited and a sale was made for one dollar and twenty-five cents he could satisfy a purchaser that he had registered one dollar and twenty-five cents by simply registering twenty-five cents, which when read in connection with the one dollar already exhibited would be equal to the one dollar and twenty-five cents received, and certain other minor devices and objects, all of which will be hereinafter more fully described, and particularly pointed out in the claims.

In the accompanying drawings, in which like reference letters and figures indicate corresponding parts, Figure 1 represents a vertical sectional view of the casing of the machine, taken on the line *x x* of Fig. 3 and showing in side elevation the preferred form of mechanism; Fig. 2, a detail perspective view of the bell which sounds when the machine is operated and of the immediate mechanism for actuating the bell-clapper; Fig. 3, a plan view of the mechanism illustrated in Fig. 1 with the casing broken away in the

Figure 4:
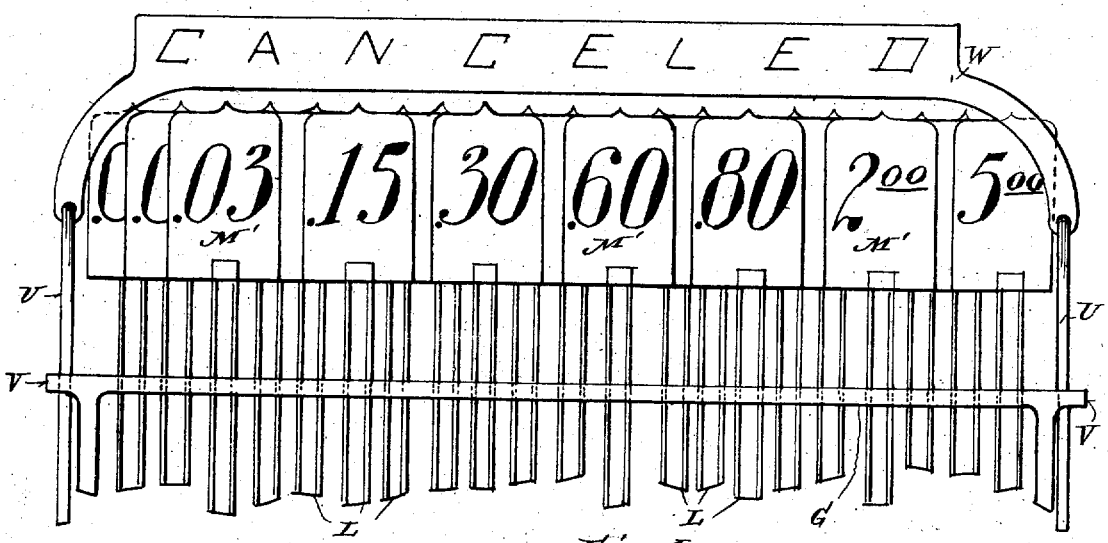
Figure 5:
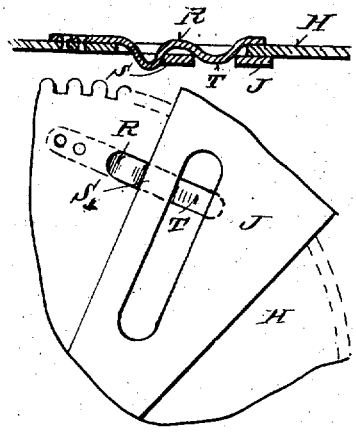
Figure 6:
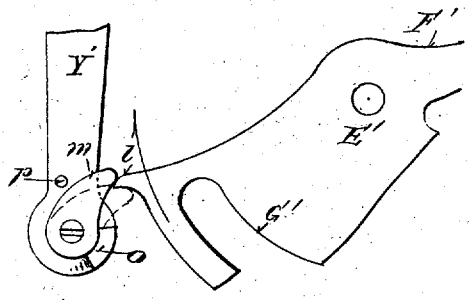
Figure 11:
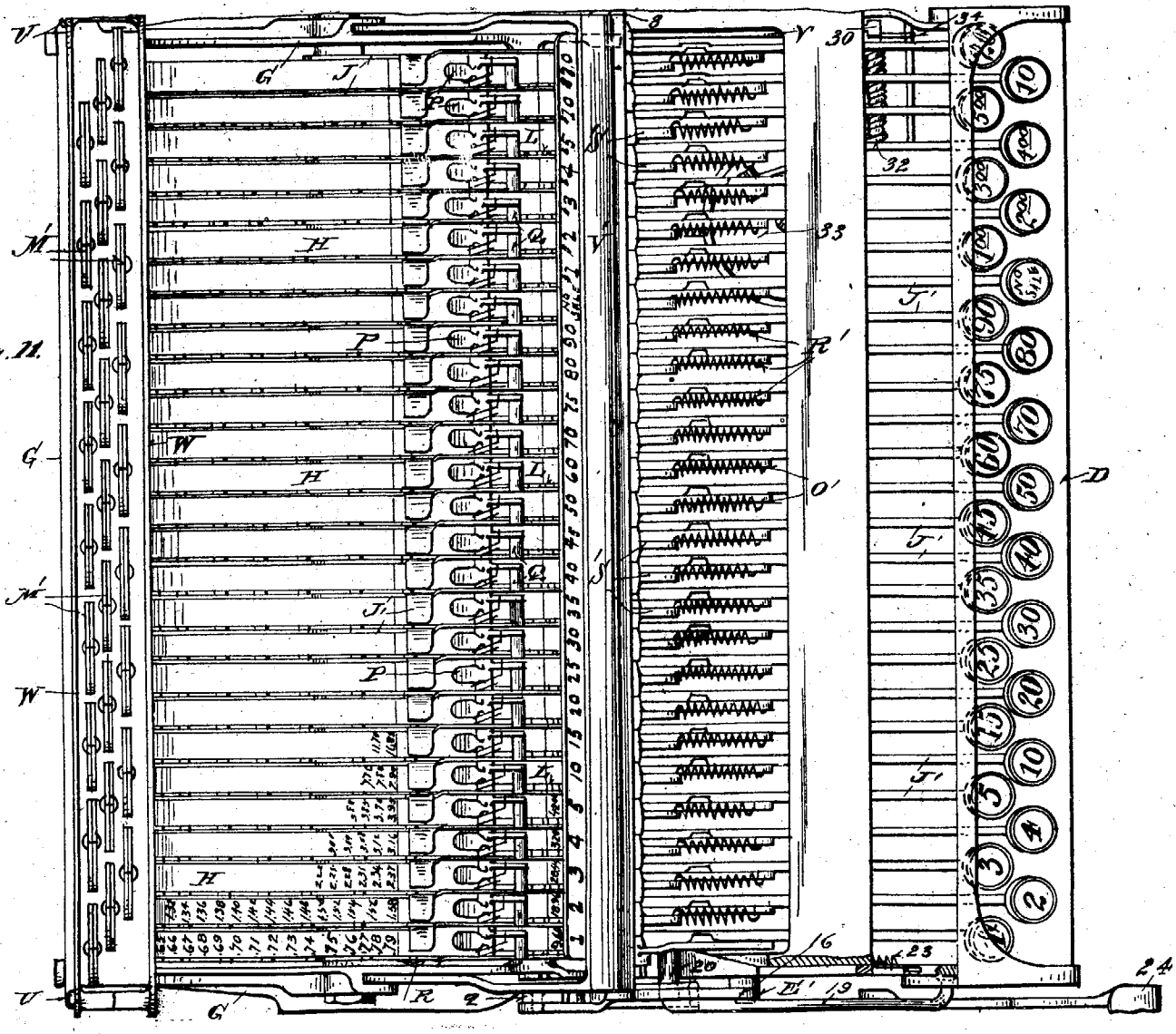

BEST AVAILABLE COPY upper portion to facilitate illustration; Fig. 4, an elevation of the face of the cancel card or plate and the indicators; Fig. 5, a sectional view and elevation of a portion of one of the registering-wheels, its double-acting spring-detent, and a portion of the frame; Fig. 6, an enlarged detail view of a portion of the cam and the arm and dog or trip for actuating the stop-bar; Fig. 7, a side elevation, with the casing removed, of a modified form of actuating mechanism, showing the same normal position in full lines and the first succeeding position in dotted lines; Fig. 7[a], a detail view of the modified form of devices for locking and unlocking the drawer; Fig. 7[b], a detail view of the pivoted cover; Fig. 8, a similar view to Fig. 7, on a slightly-larger scale, with the parts in the final or extreme operative position; Fig. 9, a detail view of the modified form of bell mechanism, key-support, and stop-bar-operating rod; Fig. 10, a horizontal sectional view on the line *y y* of Fig. 7, showing the same form of mechanism as illustrated in Figs. 7 and 8; Fig. 11, a plan view of such latter form of mechanism, the casing being omitted; Fig. 12, a side elevation, such as shown in Fig. 7, with the mechanism in normal position, but with the first succeeding position in dotted lines omitted; and Fig. 13, a like view to Fig. 8 with the parts in the final or extreme position, but with numerous of the remote devices omitted.

As observed and shown in the figures, I have illustrated two forms of mechanism for reaching the same ends. I will first describe that form embodied in Figs. 1, 3, and 6.

In Fig. 1 the full lines illustrate the machine in what may be called "zero" or normal position, the dotted lines (and I refer now particularly to the cover, its handle, the keys, and the indicator-lever) in the intermediate or first adjusted position, and the dashed lines the final or register position. This mechanism is inclosed in a suitable casing of metal or wood, designated A, with a glass or transparent housing B, through which the cancel-cards and the indicators are seen, and the hinged top or cover C, which is thrown up for getting to the inner mechanism for setting the registering-wheels back to zero. This top will be provided with a suitable lock in practice. The casing further consists of a key-cover D, preferably of circular form and mounted to swing on a pivot, and finally in the lower part of the casing is placed a money-drawer E, which is opened by a suitable spring F, when the lock mechanism, hereinafter described, is released. Within this casing I mount and secure a suitable frame G, which affords bearings for the various shafts, &c., and a guide for the rods which carry the cancel-cards and indicators.

The register mechanism proper consists of a series of wheels or disks H, hung to rotate upon a fixed arbor I, mounted in the frame G. The periphery of these wheels or disks is provided with a scale of figures agreeing with the denomination or sum indicated by the key associated with the wheels, respectively. These wheels are also provided with teeth, as more clearly seen in Fig. 1, which are engaged by an actuating or key pawl and a locking or arresting pawl to be hereinafter referred to. Between each two adjacent registering-wheels is a plate J, fixed to the shaft I and held together by a shaft K at their upper ends. This shaft carries a like series of register-wheels to those just described, designated L, but smaller in diameter. To every revolution of the wheels H the wheels L are rotated one notch, as usual in this class of mechanism, a pin M on the wheels H being arranged to engage with the teeth of the wheels L. These latter wheels also bear a scale of figures, the lowest of which is as much higher than the highest figure on the larger associated wheel as the amount indicated by the associated key, as also usual in these machines.

A rod O, supported by the plates J, carries a series of spring-detents P, having antifriction-rollers Q, which fit in the teeth of the wheels L, so that the latter will move but one notch or tooth at a time. By placing the thumb or finger on the spring-detents P and disengaging them from the wheels L the latter may be turned back to zero position by at the same time turning by hand the wheels H back to zero position. The wheels H each have a double-shouldered spring pawl R, which engages with the plates J as more clearly seen in Fig. 5. When the wheels H are rotated by actuating the keys, these spring-pawls R spring out of engagement with the plates J, as more clearly seen in Fig. 5. When the wheels H are rotated by hand back to zero position, the pawls reëngage the plates J, the shoulders S arresting them in one direction and the shoulders T arresting them against rebounding in the other direction.

A rod U at each side of the machine is guided at V in the frame G and carries two cancel cards or plates W, which may be seen when elevated from either side of the housing B and which when up indicate that the purchase has been canceled and remain up until the key-cover again closes over the keys, so that the particular key exhibiting the last sale cannot be reached again until the cover is again opened to register the next sale, which latter opening of the door is again preceded by the elevation of the cancel-card to such an extent that the amount has been canceled before the cover has opened for the operator to get access again to such key. In other words, these cancel-cards obscure the upstanding indicator, and thus cancel it before the operator can get access to the key of such indicator for the purpose of a false manipulation to make it serve the purpose of indicating a second but unregistered sale. To these rods U are attached levers X, one at each side of the machine, mounted on a cross-shaft Y, carried by the frame (See Figs.

BEST AVAILABLE COPY 1 and 3.) One of these levers has an extension Z, which is operated in the manner presently described.

The cover D, before referred to, is supported on studs D′, mounted in the frame G, and to one of these studs is secured a cam-plate E′, having a handle F′, which serves as a handle to the cover D. This cam-plate has a slot G′ concentric to its center of movement and a branched slot H′, forming a cam-surface proper to depress the front end of the extension Z of the lever X, a stud and anti-friction-roller I′ projecting from the extension Z into the slot H′. Accordingly it will be seen that by moving the handle F′ away from an operator standing in front of the machine the cam-plate E′, through its slot or race H′, will elevate the cancel-cards W, through the rods U and levers X and extension Z. When the stud I′ reaches the slot G′, the effect is merely to hold the cancel-cards elevated. Keeping this set of things in mind, attention is next directed to the series of keys J′, there being one for each large register-wheel H, said keys being hung upon a cross-shaft K′, also supported in the frame G. These keys at the rear ends each connects with a rod L′, guided in the upper part of the frame G, and each rod carries an indicator M′, bearing a figure or figures corresponding with the figure or sum on the keys, respectively. These keys further each carries a pawl O′, pivoted thereto at P′, each pawl at its upper end engaging with one of the wheels H, as shown. The pawls O′ each have a projection Q′, to which is attached a spiral spring R′, which in turn connects at the lower end with an arresting-pawl S′, of which there is one for each wheel H, engaging therewith and mounted on a cross-shaft T′, also supported by the main frame G. A further provision of each actuating-pawl O′ is the head U′, which when the pawl O′ is lifted by the actuation of the key passes behind the stop-bar, to be hereinafter described, and becomes thereby held absolutely against the possibility of escaping from its toothed engagement with its wheel H. Thus when a key has been elevated at its rear end and the amount of the purchase exhibited and the sum registered the key remains suspended and the indicator exhibited by reason of the key being held up by its pawl O′, which hangs upon its toothed engagement with its wheel and cannot be disengaged until the stop-bar is removed from contact with its head U′. This stop-bar is shown at V′ and extends across the entire row of pawls O′ and is supported upon arms which are pivoted on studs W′, projecting from the posts X′ of the frame G. One of these studs further carries an actuating-arm Y′, whose lug Z′ fits against the under side of one of the stop-bar arms.

The arresting-pawls S′ act to prevent a return movement of the large wheels when engaged by and during the disengagement therefrom of the pawls O′ and during their descent, which takes place in the manner presently to appear.

As shown in Fig. 1 and also in Figs. 7 and 8, the engagement of the upper ends of the actuating-pawls O′ with the registering-wheels is by means of laterally-projecting lugs or teeth upon the upper ends of the pawls. These lateral projections upon said pawls are immediately behind and in line with the arresting-pawls S′, so that if the upper end of any one of the actuating-pawls O′ is pulled forward to disengage the pawl from its registering-wheel the lateral projection upon such pawl will contact with the arresting-pawl S′, engaging such wheel and carrying such arresting-pawl forward out of engagement with the wheel, with the result that both pawls will be thereby disengaged from said wheel and the wheel be left free to be reset to zero or initial position.

So far in the described operation the cancel-cards have been elevated and the depressed key has elevated one indicator, and the cover D, with its handle F′, has assumed the position shown in dotted lines in Fig. 1. As the cam E′ moved during these operations it actuated the arm Y′ and the stop-bar V′; but this was of no effect and merely incidental to getting the machine started from its normal position. The stop-bar V′ of course falls back to the position shown in full lines in Fig. 1 ready to oppose any withdrawal of the pawl O′ when it moves up a little later and after the operator has depressed the key. The money-drawer E was also released during this movement of the cam E′ and the bell 2 was rung. A pitman *a*, actuated by the cam E′, presses on the inner arm of a latch *b*, mounted on a rock-shaft *c* and adapted to engage with the shoulder *d* on the drawer. The rock-shaft *c* runs across the machine and has a similar latch, which engages with a similar shoulder *d* at the farther side of the drawer. The arm *e*, also carried by the rock-shaft *c*, presses down on the trip *f*, carried by the rod *g*, projecting from the lug *h* on a cross-bar *i* of the general frame. On the rod *g* is placed the coils of the bell-clapper *j*. (See Fig. 2.) Thus the bell was rung at the time the cover was released and thrown open by the spring F. So far in the operation, as described, the cover D, with its handle F′, has reached the dotted position shown in Fig. 1. The cover is now closed, either by its own gravity or by hand. In doing this the slot or race H′ in the cam E′ receives the stud I′, and consequently the cancel-cards are permitted to drop and exhibit the indicator, which has been elevated by the key that has been depressed. Thus the machine is standing with the cover closed and one key depressed at one end and elevated at the other, as shown in the dashed lines. In this condition access cannot be had to the depressed key or to any of the others without again opening the cover D, so that, broadly stated, this device is a key-controller and con-

BEST AVAILABLE COP stitutes one means of carrying out that part of my invention which relates to preventing any key or keys from being operated while any other key is in indicating position—that is, in the position which it occupies while the amount corresponding with it is in a state of exhibition, which, as before stated, I regard as necessary to the most perfect organization of machine.

I will now refer, first, to the devices for operating the arm Y′ to elevate the stop-bar V′ to release the pawls O′, and, second, to the devices for returning the depressed or last-operated key back to normal position during the act of opening the cover, which is in reality a key-controller to register the next sale. The first of these devices consists of a lug *l* on the cam-plate E′ and of a trip *m*, pivoted to the arm Y′ and playing between a stop *o* and a stop *p*. (See Fig. 6 particularly.) When the cam-plate moved downward, the lug *l* engaged with the trip *m*, and the latter being resisted by the stop *o* the arm Y′ is forced rearward and the stop-bar V′ elevated to the dotted position, so as to free the head U′ of the then elevated pawl O′. While the arm Y′ is thus under control the trip *q*, pivoted to the cam-plate E′ and resisted in one direction by the stop *s*, is engaging with the roller *t* on the stud *u* of the projection *v*, forming a part of what I term the "presser-bar," consisting of arms *v′* hung on the cross-shaft K′, there being one at each side of the machine and connected by a cross-bar *w*, that rests upon the upper edge of all of the keys. Now when the cover D is opened to register the next sale it will be understood that the then depressed key is thus forced back into normal position by positive means—to wit, the trip *q* and the projection *v* and the cam E′. Thus the positive return operation of the key prevents the possibility of a dishonest employee from slipping some instrument into the machine when the cover is open to lock the key down, so as to use the then exhibited amount to indicate a subsequent sale of like amount. A key thus interfered with and locked down will prevent the operator after doing this and closing the cover from again opening the cover at all. Thus his instrument or wedge fraudulently inserted will be fastened up in the machine and act as a telltale on what he has been trying to do. On the other hand, the cover, it will be seen, does not open until after the trip *q* has acted against the arm *v* and forced the key up at one end and down at the other to withdraw the indicator. Thus the operator cannot get access to a depressed key to hold it down by hand and so attempt to use the amount then exhibited to represent a subsequent sale, as stated in object First *a* above, so that in this machine the possibility of fraud in the manner here indicated is absolutely prevented, for before the cover has opened enough to give access to the depressed key the slot H′ will have operated on the stub I′ and elevated the cancel-cards, while at the same time or about the same time the trip *q* will have acted on the projection *v* and forcibly elevated one end of the key and depressed the other end with its indicator. Thus also, as stated in the first object at the head of this specification, no key or keys can be operated until the key last operated has been returned to normal position by the presser device.

I will now refer to the modified form of mechanism principally shown in Figs. 7, 8, 10, and 11 of the drawings. All the mechanism in these figures, which is lettered correspondingly with the letters already used, is the same in construction as that already described and so designated. Accordingly I shall in the remaining detail description confine myself to a statement of those parts which differ in construction and which are modified in arrangement from the parts already described which perform the same functions.

In the modified form the stop-bar V′ is pivoted within the radius of the wheels H, as seen at 2, Figs. 7 and 8, instead of outside of the said wheels, and is actuated by a rod 3, extending under it and lifted at the proper time by being connected with the arm 12 of the pawl-lifting bar 11, as shown at 5. (See Fig. 9.) In the other form the pawls O′ were described as having the function, among other functions, of holding the keys in indicating position by a suspension action of the pawls O′ through their engagement with the teeth of the wheels H, which engagement is maintained by the head U′ coming against the stop-bar V′. In this form the keys are additionally held up at their rear ends by a series of holding-up pawls 6, strung on a cross-rod 7, carried by the frame, one of such pawls being under each key. Each key is also in this form provided with a foot 8, which rests upon the appropriate pawl 6 when the key is elevated at the rear end, a spring 9, attached to each of said pawls and to a cross-piece 10 of the frame, acting to draw the pawls under the footpieces at the proper time. The provision of these supporting-pawls leads to the necessity of means to dislodge them from under the footpieces 8 of the keys. This means consists of a bar 11, extending across the entire machine and having arms 12, which are pivoted upon the cross-rod 7. This bar 11 also has a stud 13, which carries an arm 14, whose other end is hung on the cross-rod 7. This arm 14 is engaged at the proper time to drop the indicators by a trip 15, carried by the cam-plate 16, which cam-plate is somewhat modified from the cam-plate E′ in the other form. This trip is actuated by a spring 16′ and stopped by a stop 17 and engages the arm in one direction and escapes it in the other direction. The trip 15 is shown engaged with the arm 14 in Fig. 8, and it will lift that arm and accordingly lift the cross-bar 11, which in turn lifts the lower ends of the supporting-pawls 6 and moves their upper ends from under the footpieces of the keys.

BEST AVAILABLE COPY

In the form first described the cover D, the handle F′, and the cam E′ are connected rigidly together. In this form the handle and door are not connected directly together, the cover being pivoted at 18 to a portion of the frame and actuated by a pitman 19, having an antifriction-roller 20, fitting a slot 21, with a branch 22 in the cam-plate 16. A spring 23, connected to the cover and suitably secured to the frame, acts to assist in returning the cover to closed position.

The handle 24 is pivoted at 25 to the frame and is connected by a pitman 26 to the cam-plate 16, while the plate itself is mounted upon a pivot 27 supported by the main frame. Thus it will be understood that when the handle is operated motion is transmitted to the cam-plate and that the latter will move from the position shown in full lines in Fig. 7 to the position shown in dotted lines in that figure, by taking hold of the handle 24 and moving it from the full-line position to the dotted-line position. In this full-line position the cancel-cards are shown as elevated, the assumption being that they have been left in that position or the machine adjusted to such position. Consequently in such full line position the stud I′ has passed from the branch H′ of the slot G′. As yet the cover D is closed. Now by moving the handle 24 from this full-line position to the dotted-line position in Fig. 7 the stud I′ will continue to remain in the slot G′, and hence to hold up the cancel-cards, and the pitman 19 will have been lifted by the branched slot 22 from out of the notch 28 in the main frame and forced forward to the dotted position, thereby opening the cover fully from the closed position designated from *a′* to *b′* to the position designated by *c′* to *d′*. In this position the parts are all in the relation indicated by the dotted lines in Fig. 7. Thus the keys are exposed above the upper corner *c′* of the now open cover. The operator will then depress the desired key to middle position, (shown by dotted lines in Fig. 8,) which will elevate the corresponding indicator and at the same time actuate the register mechanism through the pawl O′. As this operation takes place the foot 8 of the key manipulated will pass over the corresponding supporting-pawl 6 and be held up by it. The next thing to do is to lower the cancel-cards so as to expose the indicator thus elevated. This is done by moving the handle 24 from the dotted position shown in Fig. 7 to the position shown in Fig. 8, which will at the same time close the cover and set the cam-plate back to the position shown in Fig. 8. By this change of position of the cam-plate the stud I′ will have been permitted to enter the branched slot H′, a requisite of dropping the indicator-cards. This change of position of the cam-plate will also have brought the pivoted trip 15 under the arm 14, as shown in Fig. 8, so as to be ready to lift the cross-bar 11, and thus throw the supporting-pawl 6 from under the foot 8 of the key which had been depressed. This latter operation will, of course, not occur until the handle 24 is again actuated in the direction of the arrow from the position shown in Fig. 8, so as to open the cover and depress another key when another sale is made, all of which is, in practical effect, the operation of controlling the keys until the last-operated key is positively returned to normal position by the manipulation of the handle F′ or 24, as stated in the first introductory object, which handle is thus seen to be a hand-operating device.

Referring to Fig. 9, it will be seen that one of the arms 12 of the cross-bar 11 has been extended at 29, so as to lift a pawl 30, carried at the upper end of a pivoted bar or frame 31, whose pivot is supported by a part of the general frame. This mechanism is to actuate the bell-clapper 32, which strikes a bell 33, suitably supported under the keys. The clapper-arm is in the form of a wire spring coiled about the pivot-bar 31 and resting at the end 34 on the frame. Thus when the extension 29 is elevated by the action of the trip 15 and the arm 14 in the manner above described it will lift the pawl 30 and throw the bar 31 against an extension of the clapper-arm, and as the extension 29 escapes past the pawl 30 the clapper-arm rebounds and the clapper strikes the bell. This is so timed as to occur when the indicator is dropped and the drawer permitted to open. The drawer is held locked in this form of the machine by a detent 35, hung at 36 to a part of the main frame and resting at the other end on the cross-bar 11. A lug on the drawer opposes this pawl, and when the latter is raised by the cross-bar 11 the lug is freed and the drawer opened by the spring.

The objects, advantages, safeguards, and modes of operation hereinbefore described in connection with the first and preferred form of this machine each and all apply to and are performed in practice by this last-described modified form.

I would accordingly have it understood that I do not confine myself to the details of construction or the special arrangements and organizations shown and described, but that my invention is broader than these and comprehends other details of construction and other forms of arrangement and organization, so long as the same mode or substantially the same mode of operation is retained, producing like results.

The registering mechanism shown and described is of the class known as "detail adders;" but I do not confine myself to the use of this type of registering mechanism in connection with my improvements.

The cover D or key-controller is shown and described as pivoted; but it may be otherwise mounted. The stop-bar V′ is also shown and described as pivoted; but it, too, may be otherwise mounted.

In the general statement of my invention

BEST AVAILABLE COPY described herein I have used the term "hidden" in speaking of the cancel-cards; but it is to be understood that this term includes besides an actual exclusion of the indicators from view any other obstruction of them or indication that they had been canceled.

Having thus fully described my invention, what I claim as new, and desire to secure by Letters Patent, is—

1. In a cash-register, the combination with a cover adapted to inclose the keys, a cancel-card and intermediate devices connecting the said cover and said card and acting to display the card when the cover is operated.

2. In a cash-register, the combination with a pivoted cover adapted to inclose the keys, cam mechanism, a lever actuated thereby, said cover moving with the cam during at least a part of the latter's motion, and a cancel-card connected to said lever, the cam mechanism including a race adapting it to maintain the card displayed until the cover is substantially closed.

3. In a cash-register, the combination with the pivoted cover adapted to inclose the keys, a cam connected with the cover and having a main slot and a branch slot, a pivoted lever engaging with the walls of the slots by a stud and adapted by the movements of the cam to be elevated and lowered at one end and to have said end maintained elevated, and a cancel-card connected with said end.

4. In a cash-register, the combination with a series of keys, and indicators adapted to be displayed by the keys, of a key-cover normally inclosing the keys, and devices intermediate of the cover and keys which operate to return a depressed key to normal position as the cover is opened and before the cover is sufficiently opened to expose the keys.

5. In a cash-register, the combination with a series of keys, a cover normally inclosing them, indicators attached to the keys, and intermediate presser devices arranged to force a depressed key back to normal position by the action of the cover as it is opened.

6. In a cash-register, the combination with a cover adapted to inclose a series of keys, a series of such keys mounted on a pivot, an indicator connected to each of said keys, presser devices and trip devices between the keys and the cover, the cover being adapted to depress the presser devices until such key yields to the opening of the cover and the trip devices permitting the cover to close without being affected by the depressed key.

7. In a cash-register, the combination with a pivoted cover having a plate connected therewith, a series of pivoted keys inclosed by the cover, a rod connected to each key and carrying an indicator, a pivoted presser-bar engaging with the keys and a trip carried by said plate and engaging in one end escaping in the other direction with and from the presser-bar, the arrangement being such as to depress the keys by the opening of the cover, yet permitting the cover to close while a key remains depressed.

8. In a cash-register, the combination with a cover, a series of keys adapted to be normally inclosed thereby, and exposed on opening the cover, registering mechanism operated by depressing the outer end of the keys, indicators displayed by operating the keys, supporting devices for the keys to maintain any actuated key in actuated position, presser devices for the keys, and intermediate devices which, by opening the cover, release the supporting devices and operate the presser devices, whereby the cover cannot open except by returning the depressed key to normal position and withdrawing the indicator.

9. In a cash-register, the combination with a cover, a series of keys adapted to be normally closed thereby, and exposed on opening the cover, registering mechanism operated by said keys, indicator-cards displayed by said keys, supporting devices for the keys, presser devices therefor, a cancel-card and a lever connected thereto, and intermediate devices which by opening the cover release said supporting devices, actuate said presser devices and display said cancel-card in the proper succession.

10. In a cash-register, the combination with a cover, a series of keys adapted to be normally covered thereby, and to be exposed on opening the cover, indicators displayed by said keys, registering mechanism operated by said keys through pawls which also act to support said keys, stop devices for said pawls, presser devices for said keys, a cancel-card and a lever connected thereto, and devices connected with the cover and adapted to release the operating and supporting pawl, to actuate the presser devices, and return a depressed key to normal position and to actuate said lever to display the cancel-card, all in the proper succession.

11. In a cash-register, the combination with a cover, a series of keys normally covered thereby and exposed on opening the cover, indicators displayed by said keys, a lever and a cancel-card displayed by said lever, and intermediate devices connected with the cover and adapted to press a depressed key back to normal position as the cover is opened and also adapted to actuate said lever, in the proper succession.

12. In a cash-register, the combination with a cover, a series of keys adapted to be normally inclosed thereby, and exposed on opening the cover, an indicator displayed by each key, and a presser-bar for the keys, a lever and a cancel-card displayed thereby, a cam, and a trip device connected to said cam and adapted to operate the presser-bar to return a depressed key to normal position as the cover is being opened and to operate said lever, and display a cancel-card in proper succession.

13. In a cash-register, the combination with a cover, a series of keys adapted to be nor-

BEST AVAILABLE COP' mally inclosed thereby, and exposed on opening the cover, presser devices for the keys, registering mechanism and intermediate devices actuated by the keys to operate said mechanism, a stop bar or device to engage with the said devices between the keys and register mechanism to prevent their disengagement from the latter at the limit of the throw, to prevent "overthrowing" and devices connected to said cover and arranged to release the stop bar or device and to actuate the presser device, whereby on returning a depressed key to normal position the stop bar or devices are released.

14. In a cash-register, the following instrumentalities: a cover, a series of keys adapted to be inclosed thereby and exposed on opening the cover, an indicator displayed with each key, a presser device for all the keys, a key-pawl for each key and an associated arresting-pawl, register mechanism engaged and operated by each key-pawl, a stop-bar for the key-pawls, a lever, a cancel-card displayed thereby, a money-drawer, locking devices therefor and a sounding-gong, a cam-plate connected to the cover and acting to operate the presser-bar, the stop-bar, the drawer lock and gong, the actuation of these several parts being properly timed, whereby a depressed key is made inaccessible after registering, whereby such key is pressed back to normal position as a condition to the opening of the cover, whereby the cancel-card is displayed as the indicator is so withdrawn, and whereby "overthrowing" is prevented.

15. In a cash-register, the following instrumentalities: a cover, a series of pivoted keys adapted to be inclosed thereby when closed, and exposed when open, a pivoted presser-bar for all the keys, an indicator for each key, a pawl carried by each key, and register mechanism operated by each of said pawls, an associated arresting-pawl for each key-pawl, a pivoted stop-bar adapted to engage with all of the key-pawls to prevent "overthrowing," a pivoted arm carrying a pivoted trip to actuate the stop-bar, a lever connected with a cancel-card, a drawer, a lock therefor and a sounding-gong, a cam-plate connected with the cover and having a main and branched slot, a pivoted trip and projecting lug and operating a pitman to release the drawer-lock and operate the bell, the said slots, pivoted trip and lug of the cam-plate, respectively opening the said lever the presser-bar and the stop-bar-actuating arm, all substantially as described.

16. In a cash-register, the combination with a series of keys, of a pivoted presser-bar extending across the entire number of keys and having a projection by which it is operated, a cover and intermediate devices between the cover and said projection adapted to come in contact with the latter and move the same, substantially as and for the purpose described.

17. In a cash-register, the combination with a series of registering-wheels, of a series of keys, a key-pawl carried by each key and engaging with the registering-wheels, and a retaining-pawl for each wheel, the key-pawls being adapted to engage with the retaining-pawls and to withdraw the latter from engagement with the wheels when the key-pawls are manually drawn outward, whereby the said wheels may be set back to zero by thus releasing them from engagement with the key-pawls and retaining-pawls.

18. In a cash-register, the combination with a series of keys, and registering mechanism, of a pawl pivoted to each key, extending upward and so engaging with said mechanism as not to slip or slide thereon, and a stop-bar extending across the line of said pawls and arranged to engage with them to prevent their withdrawal from engagement with such mechanism and thus dropping down, whereby said pawls are made to act to suspend and hold the keys in operated position.

19. In a cash-register, the combination with a registering mechanism, operating keys and pawls, of a stop-bar located near to said pawls and arranged to come in contact with them an operating device for the stop-bar actuated from outside of the machine-casing, and intermediate devices within the casing connecting the outside operating device with the said stop-bar, whereby the stop-bar may be manually moved out of engagement with the pawls.

20. In a cash-register, the combination with the registering mechanism, a series of keys and pawls pivoted to and actuated by the latter and engaging with teeth in the former, of arresting-pawls also engaging with said teeth and a stop-bar arranged to oppose the key-pawls, and prevent their disengagement from said teeth at or about the limit of their throw, whereby "overthrowing" is prevented and the keys are suspended, the arresting-pawls preventing back motion of the registering mechanism.

21. In a cash-register, the combination with registering mechanism consisting in part of a rotatable wheel, and a double-shouldered spring-pawl attached thereto, of a fixed plate having a slot, the double-shouldered pawl being arranged to engage with said plate, substantially as shown and described.

22. In a cash-register, the combination with a series of keys, a pawl connected with each key, a pawl associated with each key-pawl, a spring connecting each key-pawl with its associated pawl and registering mechanism including toothed wheels with which both kinds of said pawls engage, the key-pawls to actuate the wheels and the other pawls to prevent the return movement of the wheels, whereby the keys are suspended as well as the wheels actuated.

23. In a cash-register, the combination with an outer casing, registering-wheels mounted therein, keys and actuating-pawls for operating said registering-wheels, arresting-pawls

BEST AVAILABLE COP' for preventing the registering-wheels from turning backward, a movable stop-bar for holding the actuating-pawls in engagement with the registering-wheel at the end of the stroke, the movable key-cover and suitable intermediate mechanism for operating the stop-bar to release said actuating-pawl and allow it to engage the succeeding tooth when the cover is opened.

24. In a cash-register, the combination with a series of keys, a key-controller, and a key-presser device, of an operating device, and connecting mechanism between said operating device and said key-controller and key-presser, respectively, whereby a movement of said operating device will press a previously-moved key back to normal position and will permit any of the keys to be moved to indicating position.

25. In a cash-register, the combination with a series of keys, a key-controller, and a key-presser device, of an operating device, a plate connected to said operating device a trip carried by said plate and adapted to act on the presser in one movement of the plate but not on the other movement, and a connection between said plate and key-controller which acts on the latter after said action on the presser.

26. In a cash-register, the combination with a series of keys, of a key-controller, an operating device, and connecting mechanism between said operating device and said controller, whereby one movement of said operating device will permit any of said keys to be moved to indicating position, and another movement thereof will prevent any of said keys from being moved while any key is still in indicating position.

27. In a cash-register, the combination, of a series of keys, a key-controller, an operating-lever, and a connection between said lever and said controller which acts on the latter to move it relatively to the keys by the movements of the lever so that one movement of said controller will permit any of said keys to be moved to indicating position and another movement thereof will prevent any of said keys from being moved while any key is still in operating position.

28. In a cash-register, the combination of a series of keys, a key-controller, an operating-lever, a plate connected to said lever, and a connection between said plate and key-controller which acts on the latter to move it relatively to the keys by the movements of the lever.

29. In a cash-register, the combination of a series of keys, a key-presser, an operating device, and connecting mechanism between said presser and operating device whereby one movement of said operating device will press any key in indicating position back to normal position, and means for locking the keys in their operated positions when the machine is in normal position.

30. In a cash-register, the combination with a series of keys, a key-presser extending across said series of keys, an operating-lever, and a connection between said lever and said presser, whereby one movement of the lever will press said presser against any key in indicating position and return it to normal position, and means for locking the keys in their operated positions when the machine is in normal position.

31. In a cash register and indicator, the combination of a series of key-levers representing different amounts and adapted to be operated by depressing their front ends, means controlled by an independent lever or handle for preventing operation of the key-levers while said lever or handle is in normal position, means for temporarily holding the key-levers in depressed position when moved thereto after the handle or lever has been moved from normal position to permit their operation, and means coöperating with said handle or lever for releasing the depressed key-levers upon the next succeeding movement of said handle or lever, whereby operation of the key-levers is prevented until said handle is moved from normal position, and whereby the key-levers are temporarily held in depressed position after being operated subsequent to the movement of the handle from normal position, and whereby the operated key-levers are released and restored to normal position upon the next succeeding movement of said handle from normal position.

32. In a cash register and indicator, the combination of a series of key-levers representing different amounts and adapted to be operated by depressing their front ends, means controlled by an independent handle or lever for preventing operation of the key-levers while such handle remains in normal position, means for temporarily holding the operated key-levers in depressed position when operated subsequent to the movement of the handle from normal position, and means controlled by said handle for releasing the operated key-levers and positively returning them to normal position at the next succeeding movement of said handle from normal position.

33. In a cash register and indicator, the combination of a series of key-levers representing different amounts and adapted to be operated by depressing their front ends, an independent handle or lever and means controlled by the same for preventing operation of the key-levers while said handle is in normal position, a money-drawer and a latch for holding it in closed position, and connections between said handle and drawer-latch, whereby operation of said handle serves both to permit depression of the key-levers and to release the money-drawer.

34. In a cash register and indicator, the combination of a series of key-levers representing different amounts and adapted to be operated by depressing their front ends, an independent handle or lever and means controlled by

BEST AVAILABLE COP the same for preventing operation of the key-levers while said handle is in normal position, a money-drawer, and a latch for holding it in closed position, an alarm-gong and a striker therefor, and connections between the independent handle and the drawer-latch and gong-striker, whereby operation of said handle serves to permit depression of the key-levers and also to release the money-drawer and sound the gong.

35. In a cash register and indicator, the combination of a series of key-levers representing different amounts and adapted to be operated by depressing their front ends, indicators coöperating with said levers to indicate the values of the operated levers, means for temporarily holding the operated levers in depressed position, an independent handle or lever and means controlled by the same for releasing the operated levers when said handle is moved from normal position, and cancel cards or screens actuated by said handle for hiding or obstructing the view of the indicators when said handle is moved from normal position to release the previously-depressed key-levers.

36. In a cash register and indicator, the combination of a series of key-levers adapted to be operated by depressing their front ends, indicators coöperating with said levers to indicate their respective values, means for temporarily holding the operated key-levers in depressed position, a money-drawer and a latch for normally holding the same in closed position, cancel-cards adapted to alternately hide and expose the indicators, and an independent handle or lever and means coöperating therewith to release the operated key-levers, to move the cancel cards or screens into position to hide the indicators, and to release the money-drawer, upon operating said independent handle.

37. In a cash register and indicator, the combination of a series of key-levers representing different amounts and adapted to be operated by depressing their front ends, indicators coöperating with said levers to indicate their respective values, a handle or lever movable independently of the key-levers and means controlled by the same for preventing operation of the key-levers while said handle is in normal position, and cancel cards or screens coöperating with said handle and moved by it into position to hide the indicators when said handle is moved from normal position to permit operation of the key-levers.

38. In a cash register and indicator, the combination of a series of key-levers adapted to be operated by depressing their front ends, indicators coöperating therewith to indicate their respective values, means for temporarily holding the operated key-levers in depressed position, an independent handle or lever and means controlled by the same for preventing operation of the key-levers while said handle is in normal position and operating when the handle is moved from normal position to not only permit operation of the key-levers but also release the key-levers depressed at the preceding operation of the machine, and cancel cards or screens for the indicators coöperating with said independent handle and moved by it into position to hide the indicators when said handle is moved to permit operation of the key-levers and release previously-operated key-levers.

39. In a cash register and indicator, the combination of a series of key-levers representing different amounts and adapted to be operated by depressing their front ends, an independent handle or lever and means controlled by the same for preventing operation of the key-levers while said handle is in normal position, a money-drawer and a latch for normally holding the same closed, indicators coöperating with the key-levers to indicate their respective values, cancel cards or screens coöperating with the indicators, and means intermediate said independent handle and the drawer-latch and cancel-cards for releasing the drawer and canceling the indication upon operating said handle.

40. In a cash register and indicator, the combination of a series of key-levers representing different amounts and adapted to be operated by depressing their front ends, indicators coöperating therewith to indicate their respective values, means for temporarily holding the operated key-levers in depressed position, an independent lever or handle and means controlled by the same for preventing operation of the key-levers while said handle is in normal position and operating when the handle is moved from normal position to not only permit operation of the key-levers but also to release the key-levers depressed at the preceding operation of the machine, a money-drawer and a latch for normally holding the same closed, cancel cards or screens coöperating with the indicators, and means intermediate said independent handle and the drawer-latch and cancel-cards for releasing the drawer and canceling the indication upon operating said handle.

41. In a cash register and indicator employing a forwardly and backwardly sliding money-drawer, and a latch for normally holding it closed and a spring for throwing it open, the combination, with said drawer and its lock or latch, of a series of key-levers representing different amounts and adapted to be operated by depressing their front ends, means for temporarily holding the operated key-levers in depressed position, an independent handle or lever, and means controlled by said handle for preventing movement of the key-levers from normal position and for releasing the money-drawer and the depressed key-levers upon operating such independent handle after the depression of any of the key-levers.

42. In a cash register and indicator employing a forwardly and backwardly sliding money-drawer, a latch for normally holding it closed and a spring for throwing it open, and an alarm-gong, the combination, with the

BEST AVAILABLE COPY money-drawer and its latch and with the alarm-gong and its striker, of a series of key-levers adapted to be operated by depressing their front ends, means for temporarily holding the operated key-levers in depressed position, an independent handle or lever, and means controlled by said handle for preventing movement of the key-levers from normal position and for releasing the operated key-levers, sounding the gong and releasing the money-drawer upon operating such handle or lever subsequent to depression of any of the key-levers.

43. In a cash-register the combination with a series of keys, of a lock for holding the keys in their depressed positions when operated, an independent handle and means connected to said handle for operating the key-locking means upon the initial movement of the handle to permit the keys to return to normal position and means for preventing operation of the keys until the handle is moved from its normal position.

44. In a cash-register the combination of a series of keys and locking means for retaining the same in their depressed positions, an operating-handle, a cash-drawer, a latch for the drawer, means connected with the handle for operating the key-locking means, means connecting the handle and drawer-latch and means actuated by the handle for preventing the operation of the keys until the handle has been moved from its normal position.

45. In a cash-register the combination of a series of keys an independent handle or lever, means controlled by the lever for preventing operation of the keys while said handle is in normal position, an alarm-gong and connections between the handle and gong, whereby the operation of said handle sounds the gong and permits the depression of the keys.

46. In a cash-register the combination of a series of keys an independent handle or lever, means controlled by the lever for preventing operation of the keys while said lever is in normal position a series of indicators operated by the keys a flash for said indicators operated by the handle; the construction being such that the operation of the handle will leave the keys free to be operated and will raise the flash.

47. In a cash-register the combination of a series of keys, a series of indicators controlled by the same means for locking the keys in their depressed positions so that an indicator corresponding to the depressed key will remain exposed an independent handle, a flash for the indicators controlled by the handle and means carried by the handle for releasing the keys that are in depressed position.

48. In a cash-register the combination with a series of keys, a series of pawls operated by said keys, a series of registering-wheels actuated by said pawls, a movable locking device for locking the pawls to the registering-wheels and a handle for operating said locking device.

49. In a cash-register the combination with a series of keys, of a series of registering-wheels, a series of pawls operated by the keys and gaging the registering-wheels, movable locking devices for locking the pawls to the wheels a cash-drawer and a handle arranged to control the movable locking devices and to release the cash-drawer.

50. In a cash-register the combination with a series of keys of a pivoted frame arranged to coöperate with all of said keys, an operating-handle, means operated by said handle for preventing the operation of the locking-frame by the keys when the handle is in one position and permitting such operation when the handle is in a different position.

In testimony whereof I affix my signature in presence of two witnesses.

RALPH P. THOMPSON.

Witnesses:
W. M. McNAIR,
JAS. C. DAWLEY, Jr.